United States Patent [19]

Hekal

[11] Patent Number: 4,693,390
[45] Date of Patent: Sep. 15, 1987

[54] LID FOR A PLASTIC CONTAINER

[75] Inventor: Ihab M. Hekal, Stamford, Conn.

[73] Assignee: Continental Can Company, Inc., Norwalk, Conn.

[21] Appl. No.: 919,051

[22] Filed: Oct. 15, 1986

[51] Int. Cl.⁴ ............................................. B65D 41/00
[52] U.S. Cl. .................................. 220/359; 220/260;
220/270; 229/123.1; 229/123.2; 229/125.17
[58] Field of Search ...................... 220/260, 270, 359;
229/43 R

[56] References Cited

U.S. PATENT DOCUMENTS

| | | | |
|---|---|---|---|
| 4,280,653 | 7/1981 | Elias | 229/43 |
| 4,448,345 | 5/1984 | Helms | 229/43 |
| 4,452,842 | 6/1984 | Borges et al. | 220/359 |
| 4,589,568 | 5/1986 | Ito et al. | 220/359 |
| 4,595,117 | 6/1986 | Walter | 220/359 |

Primary Examiner—George T. Hall
Attorney, Agent, or Firm—Charles E. Brown

[57] ABSTRACT

This relates to lids which incorporate a barrier material and which may be suitable heat bonded to plastic containers. A feature of the lid is that the area of the lid which is to be permanently bonded to the container is defined by two scores wherein, in the removal of the lid, for all practical purpose rupture of the lid material per se is eliminated and the opening operation is restricted to peeling-like separation of layers of the lid. Another feature of the lid is the controlled adhesion between the removable portion of the lid and the remainder of the lid by applying a resist layer next to the adhesive layer which secures the removable portion of the lid to the remainder of the lid. The effectiveness of the resist layer is controlled by applying the resist layer utilizing a half tone printing process.

25 Claims, 4 Drawing Figures

U.S. Patent  Sep. 15, 1987  4,693,390
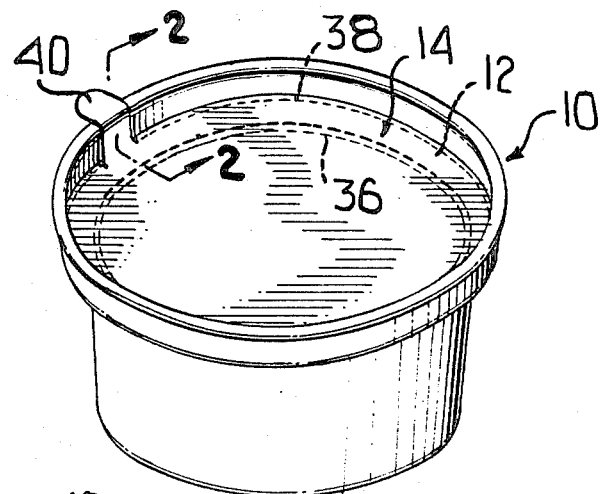
FIG.1
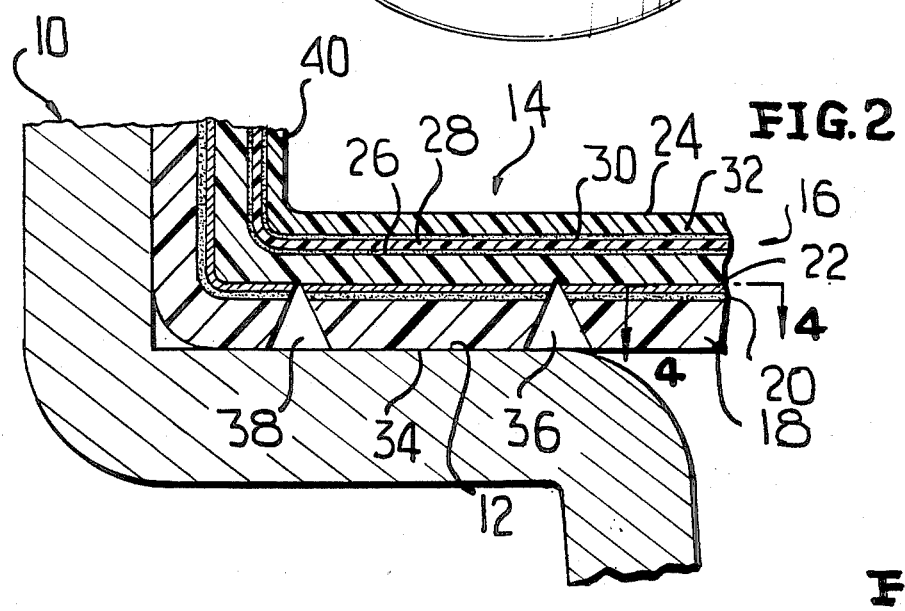
FIG.2
FIG.4
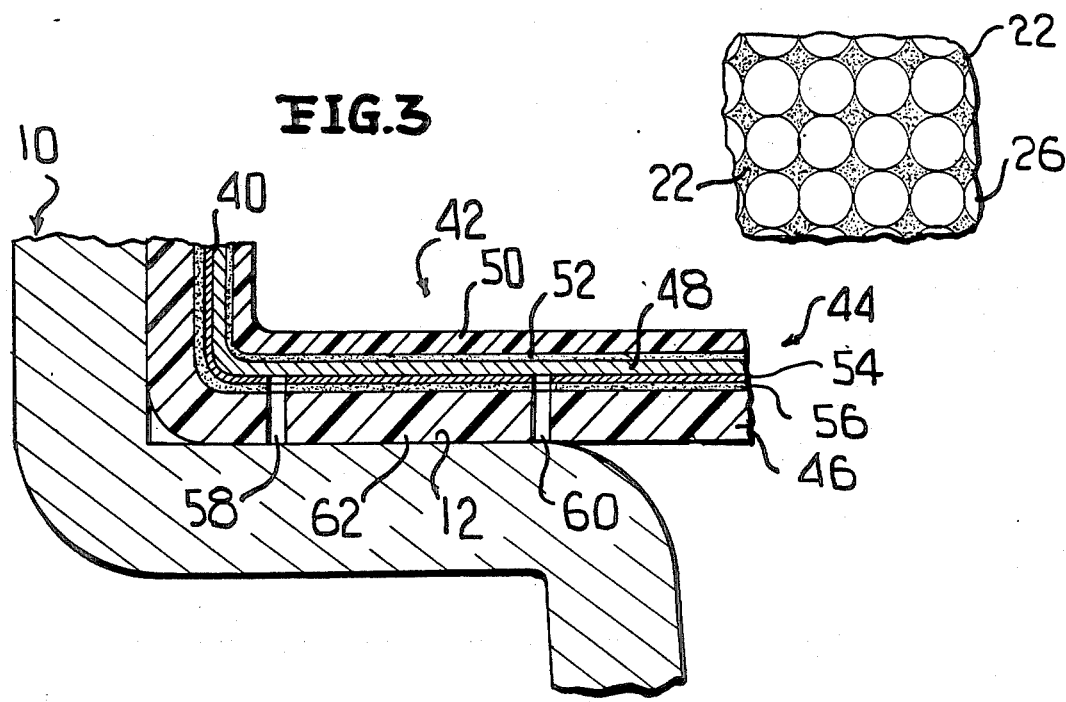
FIG.3

LID FOR A PLASTIC CONTAINER

This invention relates in general to new and useful improvements in closures for containers, and more particularly to a lid for a plastic container which is heat bonded to the container and which is manually peelable therefrom.

This invention particularly relates to a lid which has barrier properties, which may be heat sealed to a plastic container, and which is readily removable from the container in a primarily peeling action.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a top perspective view of a plastic container which is closed by a lid formed in accordance with this invention.

FIG. 2 is an enlarged fragmentary sectional view taken generally along the line 2—2 of FIG. 1, and shows more specifically the details of the lid and its relationship to a container.

FIG. 3 is an enlarged fragmentary sectional view similar to FIG. 2, and shows a modified lid construction.

FIG. 4 is a fragmentary sectional view taken generally along the line 4—4 of FIG. 2, and shows in plan a half tone printed resist layer.

Referring now to the drawings in detail, it will be seen that there is illustrated a plastic container generally identified by the numeral 10. The plastic container may be of any construction, but is preferably one of a laminated wall construction including an interior barrier layer. Further, it is preferred that the container have an exposed inner layer which may be formed of such plastic material as polypropylene. The container, as is best shown in FIG. 2, will preferably be of a construction so as to have an annular ledge 12 on which a lid, such as the lid 14, is seated and to which the lid is bonded preferably by way of an integral heat bond.

This invention most particularly relates to the construction of the lid 14 and modifications thereof. In accordance with this invention, with particular reference to FIG. 2, it will be seen that the lid is generally of a two-part initial construction which includes a barrier laminate 16 and a base layer 18 with the base layer 18 being secured to the barrier laminate by way of an adhesive 20 with there being positioned, in the illustrated embodiment of FIG. 2, between the adhesive layer 20 and the barrier laminate 16 a half tone printed resist layer 22 which will be described in detail hereinafter.

Basically the barrier laminate 16 includes an outer polypropylene layer 24 and an inner polypropylene layer 26, although other similar and compatible plastic materials may be utilized for the formation of the layers 24, 26. Between the layers 24, 26 is an intermediate barrier layer 28.

Further, because of the dissimilarities of the properties of the layers 24, 26 on the one hand and the barrier layer 28 on the other hand, the barrier layer 28 will be bonded to the layers 24, 26 by way of intermediate adhesive layers 30, 32, respectively.

It is to be understood that the barrier layer 28 will be formed of any suitable material, and while it is preferably either Saran or metal foil (aluminum), it is to be understood that other materials may be utilized equally as well.

It is also pointed out here that the barrier laminate 14, when formed entirely of plastic material, may be suitably formed by coextrusion and will be made available in continuous webs.

The barrier laminate will then be bonded to a relatively thick base layer 18 which may also be advantageously formed of polypropylene. In accordance with this invention, the base layer 18 is to be bonded to the layer 26 under controlled adhesion conditions so as to be peelable relative to the barrier laminate with the peel strength being carefully controlled.

It is known to utilize a resist to prevent or control bonding. Normally, the resist is applied as an overall layer and is placed only where peeling or non-adhesion is desired. However, in accordance with this invention, it has been deemed desirable basically to apply an overall resist layer 22 to the face of the layer 26 of the barrier laminate, but to control the areas of application of the adhesive by way of half tone printing. By engraving a half tone printing plate in the desired manner, each square area of the printing plate may be contoured to receive ink only over a preselected area of such square area. Thus, the printing area may be varied with respect to the total area, and thereby by controlling the percentage of voids in the printed area such as in FIG. 4, the percentage of the area covered by the resist may be varied, thereby to vary the adhesion of the adhesive 20 to the exposed surface of the layer 28.

Normally a lid similar to the lid 14 is directly heat bonded to the container so as sealingly to secure the lid to the container. Such a lid is then removed by rupturing the base layer and pulling the ruptured part of the base layer away from that part of the base layer which is bonded to the container ledge 12, with there being an automatic rupture of the base layer within the bonded portion of the base layer. However, this arrangement is not always operable, and particularly with certain materials is not commercially practicable.

In view of this and in accordance with this invention, there is provided radially inwardly of a surface area 34 of the base layer 18 which is to be bonded to the container ledge 12 a score 36. In a like manner, radially outwardly of the area 34 there will be provided a second score 38. Each of the scores 36 must extend entirely through the base layer 18 and preferably terminate within either the resist layer 22 or the adhesive layer 20 although it is feasible for the scores 36, 38 to terminate within the layer 26. Under no circumstances may the scores 36, 38 approach the barrier layer 28 to the extent that the barrier layer would be thinned or otherwise weakened.

As is clearly shown in FIG. 1, the lid 14 is provided with a projecting ear or tab 40 which may be gripped to effect lifting of a peripheral edge portion of the lid 14 to the extent that that portion of the base layer 18 between the scores 36, 38 will begin to separate from the barrier laminate 16. Further pulling on the lid 14 will result in a separation of the base layer 18 and the barrier laminate 16 entirely between the scores 36, 38 so as to permit the lid 14 to be entirely removed from the container 10, but leaving adhered to the ledge a narrow annular strip of the base layer which has become permanently bonded to the ledge 12. Once this occurs, the container is open for the dispensing of the product contained therein. At the same time the container becomes reclosable by reapplying the lid.

It is to be understood that the score lines 36, 38 are to be preferably formed by utilizing a scoring tool wherein the material is displaced and squeezed out in the formation of the score lines 36, 38.

In the embodiment of FIG. 3, the lid 42 will be of the same basic construction including a barrier laminate 44 and a base layer 46. However, the barrier laminate 44 will preferably be in the form of an aluminum foil layer 48 which has applied to an upper surface thereof a protective plastic layer 50 which normally will be bonded to the aluminum foil surface by way of an adhesive layer 52. The protective layer 50 will preferably be formed of a suitable plastic material including polypropylene.

In order to provide for controlled peeling of the barrier layer 44 relative to the base layer 46, there is applied to the exposed surface of the aluminum foil layer 48 a resist layer 54 by a half tone printing process. Thereafter, there will be an overall coating to form an adhesive layer 56 which overlies the resist layer 54. The adhesive 56 serves to bond the base layer 46 to the aluminum foil layer 48.

Although from a commercial standpoint in most instances the resist layer will be printed onto the barrier laminate, it is feasible to print the resist layer onto the base layer with the adhesive being positioned between the resist layer and the adjacent face of the barrier layer.

In the embodiment of FIG. 3, in lieu of conventional score lines such as the score lines 36, 38, the base layer 46 will have formed in the undersurface thereof two score lines 58, 60 which will extend substantially to but not into the aluminum foil layer 48.

The score lines 58, 60 will set off a surface area 62 of the base layer 46 which is to be bonded to the ledge 12 of the container 10. The score lines 58 will be relatively narrow and are preferably formed by a laser vaporizing operation. By utilizing a laser beam to effect the burning of the base layer 46 and by beneficially utilizing the character of the laser beam to be reflected by the aluminum layer, forming of the score lines 58, 60 entirely through the base layer 46 while assuring against the forming of the score lines 58, 60 so as to extend into the aluminum foil layer 48, proper depth control with respect to the scores 58, 60 may be assured.

It is to be understood that the lid 42 may be applied to the container 10 in the manner described with respect to the lid 14 and that the lid 42 will be provided with a projection or ear similar to the projection or ear 40 to facilitate removal. It is to be understood that in the removal of the lid 42 no rupture of any layer of the lid is required and that the entire opening operation with respect to the lid will be one of a peeling action between the adhesive layer 56 and the resist layer 54.

It is also to be understood that it is feasible to print the resist layer onto the base layer and then to apply the adhesive layer over the resist layer.

With further reference to the embodiment of FIG. 2, it is to be understood that in the formation of score lines 36, 38, it is necessary that there be an intermediate plastic layer, such as the layer 26, between the base layer 18 and the barrier layer 28 so that there will be a degree of tolerance in the formation of the score lines 36, 38 wherein it will be certain that the score lines extend through the base layer 18 and terminate in spaced relation to the barrier layer 28.

Although in FIG. 1 the radially outer score line 38 has been illustrated as extending entirely about the periphery of the closure or lid 14, it is to be understood that the score lines 38 and 58 may be restricted to the area of the pull tab 40. More particularly, the score lines 38 and 58 may be continuations of the outer periphery of the lid 14 as opposed to being radially inwardly of the outer periphery as shown in FIG. 1. On the other hand, it will be readily apparent that the score lines 38 and 58 may be disposed radially inwardly of a continuation of the outer periphery of the lid 14 and progressively tapered to the outer periphery on opposite sides of the pull tab 40.

It will be appreciated that by providing the radially outer score line in the vicinity of the pull tab 40, the force required to initiate peeling of the lid 14 from the container 10 may be controlled.

Although only several preferred embodiments of the invention have been specifically illustrated and described herein, it is to be understood that minor variations may be made in the lid construction without departing from the spirit and scope of the invention as defined by the appended claims.

I claim:

1. A lid for a plastic container, said lid comprising a barrier laminate, a base forming means for bonding said lid to a container, an adhesive layer between said base layer and said barrier laminate, a half tone printed resist layer between said base layer and said barrier laminate next to said adhesive layer for controlling the peel strength of an adhesive bond between said base layer and said barrier laminate as provided for by said adhesive layer, and score line means in and through said base layer defining an area of said base layer to be permanently bonded to a container and to be peeled from the remainder of said lid.

2. A lid according to claim 1 wherein said score line means includes a score line spaced radially inwardly of a peripheral edge of said lid and defining a radially inner boundary of said area of said base layer.

3. A lid according to claim 1 wherein said lid includes a pull tab extending outwardly from the general outline of said lid for effecting removal of said lid and opening of an associated container by peeling of said remainder of said lid from that portion of said base layer to be permanently bonded to a container.

4. A lid according to claim 3 wherein said score line means includes a score line spaced radially inwardly of a peripheral edge of said lid and defining a radially inner boundary of said area of said base layer, and an outer score line extending transversely across said pull tab and forming an outer boundary of said area of said base layer in the vicinity of said pull tab.

5. A lid according to claim 1 wherein said score line means are mechanically formed.

6. A lid according to claim 1 wherein said barrier laminate includes an outer plastic layer, an intermediate barrier layer, and an inner plastic layer, said score line means terminating at least in said inner plastic layer spaced from said barrier layer whereby rupture of said barrier layer is precluded.

7. A lid according to claim 1 wherein said barrier laminate includes an outer plastic layer and an inner metal foil layer, and said score line means are laser formed with said score line means automatically terminating at said inner metal foil due to reflection of the laser beam.

8. A lid according to claim 6 wherein said intermediate barrier layer is a plastic material layer.

9. A lid according to claim 6 wherein said intermediate barrier layer is a metal foil layer.

10. A lid according to claim 1 wherein said barrier laminate is a coextruded laminate.

11. A lid according to claim 1 wherein said barrier laminate is a coextruded laminate, and said resist layer is printed onto said coextruded laminate.

12. A lid for a plastic container, said lid comprising a barrier laminate, a base layer forming means for bonding said lid to a container, an adhesive layer between said base layer and said barrier laminate, and score line means in and through said base layer defining an area of said base layer to be permanently bonded to a container and to be peeled from the remainder of said lid.

13. A lid according to claim 12 wherein said score line means includes a score line spaced radially inwardly of a peripheral edge of said lid and defining a radially inner boundary of said area of said base layer.

14. A lid according to claim 12 wherein said lid includes a pull tab extending outwardly from the general outline of said lid for effecting removal of said lid and opening of an associated container by peeling of said remainder of said lid from that portion of said base layer to be permanently bonded to a container.

15. A lid according to claim 14 wherein said score line means includes a score line spaced radially inwardly of a peripheral edge of said lid and defining a radially inner boundary of said area of said base layer, and an outer score line extending transversely across said pull tab and forming an outer boundary of said area of said base layer in the vicinity of said pull tab.

16. A lid according to claim 12 wherein said barrier laminate includes an outer plastic layer, an intermediate barrier layer, and an inner plastic layer, said score line means terminating at least in said inner plastic layer spaced from said barrier layer whereby rupture of said barrier layer is precluded.

17. A lid according to claim 12 wherein said barrier laminate includes an outer plastic layer and an inner metal foil layer, and said score line means are laser formed with said score line means automatically terminating at said inner metal foil due to reflection of the laser beam.

18. A lid according to claim 12 wherein said barrier laminate is a coextruded laminate.

19. A lid for a plastic container, said lid comprising a barrier layer, an intermediate plastic layer below and bonded relative to said barrier layer, and a further plastic layer below and bonded relative to said intermediate layer and score line means formed in an undersurface of said lid defining a portion to be bonded to a plastic container, said defined portion to be separated from the remainder of said lid in removal of said lid from a container, said score line means extending through said further layer and terminating in said intermediate layer in spaced relation to said barrier layer.

20. A lid according to claim 19 wherein said score line means includes a radially inner score line defining a radially inner boundary of said defined portion, and a radially outer score line radially spaced from said radially inner score line and at least in part defining a radially outer boundary of said defined portion.

21. A lid according to claim 19 wherein said score line means terminate in said intermediate layer.

22. A lid according to claim 19 wherein the bonding of said further layer to said intermediate layer is effected by an adhesive layer, and said score line means extend at least into said adhesive layer.

23. A lid according to claim 19 wherein said further layer is a base layer of said lid.

24. A lid according to claim 19 wherein a protective layer overlies said barrier layer.

25. A lid according to claim 24 wherein said protective layer, said barrier layer and said intermediate layer define a barrier laminate, and said further layer is a base layer bonded to said barrier laminate.

* * * * *